Figure 5:
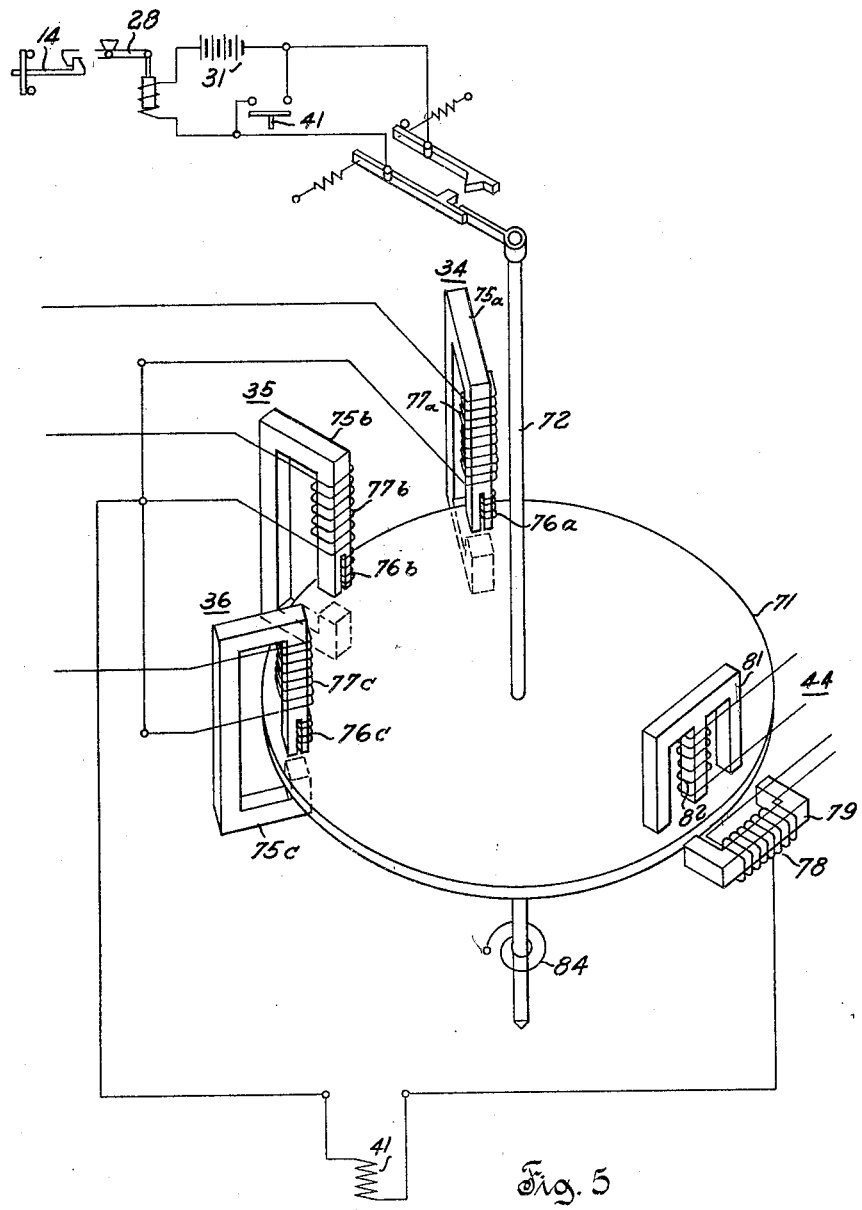

May 2, 1933. J. JONAS 1,906,468
PROTECTIVE SYSTEM
Filed March 10, 1932 2 Sheets-Sheet 1
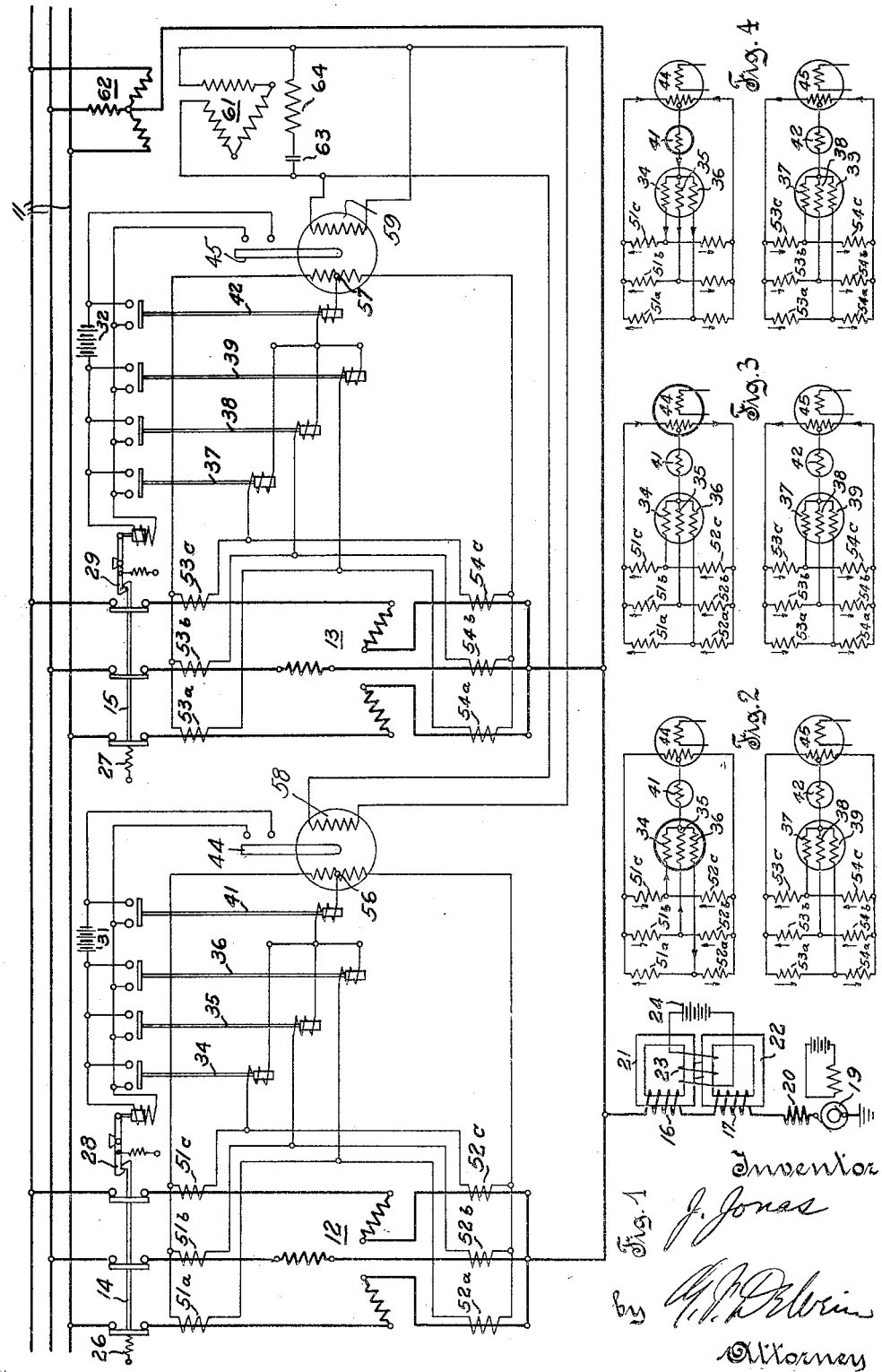

Patented May 2, 1933

1,906,468

UNITED STATES PATENT OFFICE

JULIUS JONAS, OF BADEN, SWITZERLAND, ASSIGNOR TO AKTIENGESELLSCHAFT BROWN BOVERI & CIE., OF BADEN, SWITZERLAND, A JOINT STOCK COMPANY OF SWITZERLAND

PROTECTIVE SYSTEM

Application filed March 10, 1932, Serial No. 597,997, and in Germany February 26, 1931.

This invention relates to improvements in protective systems and particularly to systems for the selective protection of electrical apparatus provided with a neutral point and connected with an electric circuit in parallel with similar apparatus.

Any one of a number of pieces of electrical apparatus connected in parallel with an electric line are subject to a number of different faults such as short circuits to the frame or short circuits between phases, i. e., to flash-overs or mechanical disturbances of the insulation about the windings whereby a conductive connection is made between the current or voltage carrying portions of the apparatus with the frame or with ground and to the formation of conductive connections between several phases within the apparatus or between the terminals thereof which connections are generally due to flash-overs. Differential protective systems are, therefore, provided to secure the selective disconnection of a damaged piece of apparatus from an electric line without disturbing the operation of other apparatus connected with the line in parallel with such faulty apparatus. Such systems usually comprise current transformer sets associated with each piece of apparatus and a relay which is operated by the current in the secondary windings of such transformer sets. One of the transformer sets is usually connected between the outside terminals of the apparatus and the line and another transformer set is usually connected between the internal terminals of the apparatus and the neutral point which connects the several phases of the apparatus in star. The terminals of the secondary windings of the transformers of each set associated with the same phases are connected and the transformers of each set are connected in star to provide neutral points therefor, but the arrangement of the secondary windings relative to the primary windings of the transformers is such that, when the windings of the apparatus with which any two connected transformer sets are associated is free from fault connections, the E. M. F.'s of the transformer secondary windings of the connected sets are in series so that a current is induced in the secondary windings which fully balances the current in the primary windings. Such secondary current flows only in the windings associated with the corresponding phases and their connections, but not through the connection of the neutral points thereof of such transformer.

The relay connected with the secondary windings of the current transformers and controlling the switch for disconnecting the apparatus from the line upon the occurrence of fault connections in the winding of such apparatus has three operative portions with the coils thereof connected in star, the free ends of the several coils being connected with the connection of the several secondary windings of the transformers associated with the same phases of one piece of apparatus. The neutral point of the relay coils is connected with the conductor connecting the neutral points of the transformer secondary windings.

Differential systems of the character above indicated, however, operate only when the cause of failure of the apparatus is either a short circuit between the phases externally of the apparatus or when the fault connection is between a winding and the frame or tank of the apparatus, but not when the cause of failure is a short circuit in only one of the windings within the apparatus.

In the usual differential protective system, when a short circuit takes place between the phases externally of the apparatus or between the outside terminals thereof, between the current transformers and generator phase winding, current from the apparatus and from the line flows to the fault connection point. The current flow on the two sides of the fault connection point is therefore in opposite directions. The currents in the series connected secondary windings of the current transformers of the same phases of one piece of apparatus likewise flow in opposite directions so that the secondary currents flow through the differential relay and cause operation thereof.

When a short circuit, however, takes place between one of the phases and the grounded frame, the current flowing in the ground connection disturbs the equilibrium of the secondary ampere turns in the transformer sets, which secondary ampere turns are equal in number and are connected in opposite directions, so that a current proportional to the ground current flows in the connection between the neutral points of the transformer secondary windings and the differential relay operates. Such differential relay will not, however, operate when a short circuit occurs in a winding of the apparatus.

It is, therefore, an object of the present invention to provide a system for selectively protecting electrical apparatus connected in parallel with an electric line by causing disconnection of damaged apparatus from the line.

Another object of the present invention is to provide a system for selectively disconnecting electrical apparatus, having a grounded neutral point and connected in parallel with other apparatus to a line, upon the occurrence of a short circuit between phases, a ground or a short circuit in one phase of the apparatus.

Another object of the present invention is to provide a system for selectively protecting any one of a plurality of pieces of electrical apparatus, connected in parallel with an electric line and having interconnected neutral points, from the effects of a short circuit in a phase within the apparatus by causing disconnection of the damaged apparatus from the line.

Another object of the present invention is to provide a system for selectively protecting electrical apparatus connected in parallel with an electric line by causing disconnection of damaged apparatus from the line, the means controlling such disconnection operating selectively in dependence upon the cause of the damaging of the apparatus.

Another object of the present invention is to provide a system for selectively protecting electrical apparatus connected in parallel with an electric line by causing disconnection of damaged apparatus from the line, the means for controlling such disconnection selectively indicating the cause of the damaging of the apparatus.

Objects and advantages other than those above set forth will be apparent from the following description when read in connection with the accompanying drawings in which:

Fig. 1 diagrammatically illustrates one embodiment of the present invention showing two pieces of electrical apparatus such as generators, having grounded neutral points, connected with an electric line and provided with current transformer sets and relays comprising the protective system for selectively disconnecting a generator upon the occurrence of a fault therein;

Fig. 2 diagrammatically illustrates the conditions of the circuits including the current transformer sets and the relays when a short circuit takes place between the phases of a generator;

Fig. 3 diagrammatically illustrates the conditions of the circuits including the current transformer sets and the relays when a connection occurs between a phase winding of electrical apparatus and the grounded frame, or tank or ground;

Fig. 4 diagrammatically illustrates the conditions of the circuits including the current transformer sets and the relays when a short circuit occurs between turns of one of the phase windings within one of the generators; and Fig. 5 somewhat diagrammatically illustrates a relay structure which combines into a single instrument a number of the relays shown in Fig. 1 as being separate constructions.

Referring more particularly to the drawings by characters of reference, numeral 11 designates an electric power line having a plurality of pieces of electrical apparatus such as generators 12 and 13 connected therewith by means of circuit breakers as at 14 and 15. The several phase windings of each of the generators are connected to form a neutral point and the several neutral points are connected and grounded through a reactance coil divided into two portions 16 and 17 and a source of alternating current as indicated at 19. The two portions of the reactance coil are wound on separate cores 21 and 22 which are inductively coupled by a winding 23 energized from a source of current 24.

Due to the magnetization of cores 21 and 22 by winding 23 upon energization thereof from battery 24, the inductance of coil 16, 17 increases rapidly with increase in the current flowing therethrough. Such increased inductance is employed to limit the current flowing to ground upon the occurrence of a short to the frame of the apparatus or to ground. The sensitivity of the relay arrangement is thus increased and the destruction of such short circuited portions is prevented. The current source 19 produces a current in case of a short circuit to the frame, if the short circuit occurs between the internal terminals of the generator and ground, even though no voltage is flowing into the short circuit from the generator. Any suitable source of alternating current potential may be used in place of generator 19 but if such alternating current potential is taken from the line 11 by means of a transformer, the voltage vector of the generator is displaced relative to ground, even in normal operation, by the amount of the voltage of the transformer. To avoid such displacement, it is preferable to use an alternating current generator which is weakly excited from a battery as shown. When a frame short circuit occurs the generator 19 excitation increases due to its series field winding 20, due to the flow of ground current, to a value which corresponds to the upper limit of the current transmitted by the reactance coil 16, 17.

The circuit breakers are normally retained in closed position against the action of springs 26 and 27 by means of latches 28 and 29 electromagnetically operated from batteries 31 and 32, respectively. Connection of the batteries 31 and 32 with the electromagnets of the latches 28 and 29 is jointly controlled by a plurality of relays 34, 35, 36 and 37, 38, 39, which are similarly connected; relays 41 and 42 which are similar and are similarly connected, and relays 44 and 45 which are similar and are similarly connected.

Transformer sets 51, 52, 53 and 54, each set comprising three current transformers designated a, b, and c, in each set, are arranged in the phase conductors between the generators and the circuit breakers and between the windings of the generators and the neutral point connections thereof. One end of each of the transformer secondary windings of each set is connected with the end of the secondary winding of the other set of transformers associated with the same phases of the same generator and the other end of each of the secondary windings of each set are connected to form a neutral point. The neutral points of the transformer sets associated with one generator are interconnected by the coils 56 and 57 which form the current coils of the wattmetric relays 44 and 45, respectively.

One end of the coils of each of the relays 34, 35, 36 and 37, 38, 39, is connected with the connections between the secondary windings of the current transformers in the same phases of the same generator and the other end of the coils is connected to form a common point for each coil. The coils of relays 41 and 42 are connected with such common points and with the mid-tap of the current coils 56 and 57 of wattmetric relays 44 and 45, respectively. The voltage coils 58 and 59, which are secured upon the armature of the relays 44 and 45 for movement therewith, are connected with the secondary winding 61 of a transformer having a primary winding 62 connected in star and connected with the line 11. The neutral point of the primary winding 62 is connected with the ground connection between the generators 12 and 13. A condenser 63 and a reactance coil 64 are connected across the terminals of the secondary winding 61 and are tuned to the third harmonic of the line frequency to provide a short circuit path for the same to prevent influencing the voltage coils 58 and 59 thereby. The windings 61 and 62 are preferably arranged on only three legs of a four legged core to provide an unwound return path for the flux in the wound legs.

The circuits of the protective system are shown diagrammatically in Fig. 2 for the case of a fault between the phases of the generator 12. As may be seen from the drawings, current flows in opposite directions in the secondary windings of the transformer sets 51 and 52 thus causing current to flow from transformers 51b and 52b through the coil of relay 35 and from transformers 51c and 52c through the coil of relay 34 to the common point of the relays 34, 35 and 36 from which the current returns through the coil of relay 36 to the transformers 51a and 52a in which it flows in opposite directions. Relays 34, 35 and 36 are therefore energized and close the circuit of battery 31 through the electromagnet of latch 28 thus tripping the latch and permitting spring 26 to open circuit breaker 14 to disconnect generator 12 from the line 11. In the current transformer sets 53 and 54 connected with generator 13 the secondary currents, however, flow in the same direction and therefore compensate each other. No current, therefore, flows through either the coils of relays 37, 38 or 39, or the common point connection of such coils and none of such relays accordingly operate.

Fig. 3 diagrammatically shows the conditions in the relay circuits when a short circuit occurs in one winding of the generator 12. Such short circuit displaces the vector position of the neutral point of the generator 12 relative to the position of the neutral point of the generator 13 and a current flows from the neutral point of generator 12 to the neutral point of generator 13. From the neutral point of generator 13 the current flows through the primary windings of transformer set 54, through the several phase windings of generator 13, through the primary windings of current transformer set 53, line 11, primary windings transformer set 51, the several phase windings of generator 12, primary windings of transformer set 52 to the neutral point of the generator 12. Such current, however, flows in opposite directions in the transformer sets associated with the two generators and the currents are displaced 180° relative to each other. The current flows in the same direction in the secondary windings of all of the current transformers associated with each generator, but does not flow through the windings of relays 41, 42. The current coils 56 and 57 of the wattmetric relays 44 and 45, respectively, thus receive current flowing in opposite directions in the neutral point connections of the several transformer sets. The voltage coils 58 and 59 of the wattmetric relays, due to the displacement of the position of the neutral point of generator 12 relative to the position of the neutral point of generator 13, receive a dissymmetry voltage from the transformer secondary windings 61. Both of the wattmetric relays, therefore, operate but in opposite directions due to the 180° displacement of the current flowing in their respective current coils. Relay 44 operates to bridge its contacts thus causing completion of a circuit from battery 31 to the electromagnet of latch 28 which trips to permit opening of circuit breaker 14 whereas relay 45 moves in the direction away from its contacts. Generator 12 is, therefore, disconnected and generator 13 remains connected.

Fig. 4 diagrammatically shows the conditions in the current transformer and relay circuits when a short circuit is formed from one of the windings of generator 12 to the frame thereof and hence to ground. In such case a current flows through the short circuit to ground and through the ground connection to the neutral point connection of generators 12 and 13. One portion of such current then flows through the neutral point of generator 12 and the windings of the generator to the short circuit point therein and thence to the neutral point of the generator 13 with the remaining portion of the current from which point all of the current flows through the windings of generator 13, line 11, and the windings of generator 12 to the short circuit point of generator 12. The current thus flows in the same direction through the primary winding of both transformer sets 53 and 54 associated with the undamaged generator 13 but flows in opposite directions in the primary windings of transformer sets 51 and 52 associated with the short circuited generator 12. Due to the fact that the ground current flows through the neutral point connection of the generators, and an unbalanced current is produced which flows through the neutral point connection of the secondary windings of the transformer sets, such current flows through the transformer secondary windings in the opposite direction and through the neutral point connection of the damaged generator 12 to the current coil 56 of the relay 44, to the mid-tap thereof and through the coil of relay 41 to the common point connection of the coils of relays 34, 35, 36, and through the coils thereof to the connections between the transformer secondary windings on the same phases of the generator 12. In the transformer sets associated with the undamaged generator 13, the current flows in the same direction through the transformer secondary windings and through the neutral point connections of the transformer set 54 and the coil 57 of the relay 45 and back to the neutral point connection of the transformer set 53 without passing through the coils of relays 37, 38, 39 or relays 42. Relay 41 operates to complete the circuit of battery 31 thus causing disconnection of generator 12 from the line 11 as above described. The ampere turns of the several portions of the current coils 56 and 57 are arranged in opposite directions and are equal in number so as to compensate each other when the current flows therethrough from the transformer secondary winding neutral points to the mid-taps of the coils. Wattmetric relay 44 cannot, therefore, operate and only relay 41 operates to cause disconnection of generator 12. As above stated, a current flows through coil 57 of wattmetric relay 45. Due to the fact, however, that the current flow in the ground circuit is limited by the inductance of reactance coil 16, 17 and generator 19, 20, no material displacement of the position of the neutral point potential of the generators relative to each other takes place. The voltage coils 58 and 59 of the wattmetric relays, therefore, receive only a very low voltage and do not operate. Even if such voltage were sufficient to operate the relays, it will be seen that relay 45 would operate in a direction away from its contacts thus preventing energization of the electromagnet of latch 29 and hence avoiding opening of circuit breaker 15.

The relays 41 and 42 may be omitted if the relays 34, 35, 36 and 37, 38, 39 are so constructed as to operate when current flows through all of the coils thereof in the same direction. The relays 34, 35, 36 and 37, 38, 39 may be combined with the wattmetric relays 44 and 45 respectively, to produce a single instrument for each generator instead of four instruments as has been shown in Fig. 1.

Fig. 5 schematically illustrates one embodiment of such combined relay structure in which 71 designates a disk mounted on a shaft 72 which rotates in suitable bearings (not shown). A plurality of electromagnets each comprising a core 75 having a portion thereof enclosed in a shading coil 76 and an exciting winding 77 arranged about the core, are arranged in inductive relation with the disk. The several cores 75a, 75b, 75c; shading coils 76a, 76b, 76c, and the exciting windings 77a, 77b, 77c, are portions of three single phase systems; the shading coils, when excited, produce a torque on the disk and determine its direction of rotation. The exciting windings take the place of the coils of relays 34, 35, 36, or 37, 38, 39, and being similarly connected form a common point. The common point of the exciting windings is connected with a mid-tap on a coil 78 arranged on a core 79 and having the ends thereof arranged for connection with the neutral point connection of the current transformer sets shown in Fig. 1. The coil 78 and its core are arranged on the one-half disk 71 not occupied by the above described three single phase systems and, with the electromagnet formed by a core 81 and a coil 82, comprise a wattmetric relay such as indicated at 44 and 45 in Fig. 1; the coil being arranged for connection with the secondary winding 61 of the voltage transformer. The current and voltage coils 78 and 82, respectively, are so connected with the sources from which they are energized that, when connected with a damaged generator, a torque will be produced in the same direction as that produced by the three single phase systems of electromagnets, replacing the differential operating relays. Suitable means for returning the disk to its zero position, such as the spiral spring 84, is provided; one end of the spring being connected with the shaft and the other end thereof being connected with a suitable fixed point such as a housing (not shown) for the relay. Movement of the disk in the opposite direction from that which causes connection of the battery 31 or 32 with the electromagnets of the circuit breaker latches is prevented by a stop, (not shown). Such relay will operate whether the cause of the fault condition be a winding short circuit or a short circuit between a winding and the frame, and will always operate in the same direction.

It is claimed and desired to secure by Letters Patent:

1. In a system for selectively protecting a plurality of pieces of electrical apparatus each arranged for connection in parallel to an electric line, circuit breakers for connecting and disconnecting each piece of apparatus and the line, electromagnetically operated devices for releasing each of said circuit breakers to permit disconnecting movement thereof, a source of electric current for energizing each of said electromagnetic devices, a plurality of relays for connecting each of said electromagnetic devices with the said source of current associated therewith, two current transformer sets for each piece of apparatus, one of said sets being arranged between the windings of the apparatus and said circuit breaker and the other of said sets being arranged between the windings and the neutral point of the apparatus, said transformer sets each comprising a transformer for each phase of each piece of apparatus, the transformers of each said set having one terminal interconnected to form neutral points, the neutral points being connected, the other terminal of the transformers of each said set associated with the same phases being connected, the neutral point connection of said sets and the other terminal connection of the transformers of each set on the same phases being connected through the coils of said relays to cause operation thereof selectively in response to different fault conditions in any piece of apparatus.

2. In a system for selectively protecting a plurality of pieces of electrical apparatus each arranged for connection in parallel with an electric line, circuit breakers for connecting and disconnecting each piece of apparatus and the line, electromagnetically operated devices for releasing said circuit breakers to permit disconnecting movement thereof, a source of electric current for energizing each of said electromagnetic devices, current transformer sets each comprising a transformer for each phase of the apparatus, each of the pieces of apparatus having one of said sets arranged between the windings of the apparatus and said circuit breaker and another of said sets arranged between the windings and the neutral point of the apparatus, the transformers of each set having one terminal thereof interconnected to form neutral points, and relays each having a current coil interconnecting the neutral points of said transformer sets associated with the same piece of apparatus and having a voltage coil, said relays being arranged to connect said electromagnetic devices with said sources of current associated therewith selectively in response to the occurrence of a fault condition in any piece of apparatus.

3. In a system for selectively protecting a plurality of pieces of electrical apparatus arranged for connection in parallel with an electric line, a circuit breaker for connecting and disconnecting each piece of apparatus and the line, an electromagnetically operated device for releasing each of said circuit breakers to permit disconnecting movement thereof, a source of electric current for energizing each of said electromagnetic devices, current transformer sets each comprising a transformer arranged on each of the phases of each piece of the apparatus, one of said sets being arranged between the windings of the apparatus and said circuit breaker and another of said sets being arranged between the windings of the apparatus and the neutral point thereof, one terminal of the secondary windings of each said sets of transformers being connected in star, the star points of said sets associated with each piece of apparatus being interconnected, the other terminal of the secondary windings of the transformers of each said set on the same phase of the same piece of apparatus being connected in series, a relay connected with each of the series connected transformer secondary windings, the coils of the said relays being connected to form a neutral point, a relay having current coils connected with the star points of said transformer and having a voltage coil, all of said relays being arranged for selectively connecting said electromagnetic devices with the said source of current associated therewith, in response to the occurrence of fault conditions of any piece of the apparatus.

4. In a system for selectively protecting a plurality of pieces of electrical apparatus each having a grounded neutral point and being arranged for connection in parallel with an electric line, circuit breakers for connecting and disconnecting each piece of apparatus and the line, an electromagnetically operated device for releasing each of said circuit breakers to permit disconnecting movement thereof, a source of electric current for energizing each of said electromagnetic devices, current transformer sets each comprising a transformer arranged on each of the phases of each of the pieces of apparatus, said transformer sets being arranged between the windings of the apparatus and said circuit breaker and between the windings of the apparatus and the neutral point thereof, one of the terminals of the secondary windings of each said sets of transformers being connected in star, the star points of said sets associated with each piece of apparatus being interconnected, the other terminals of the secondary windings of the transformers of said sets on the same phases of the same apparatus being connected in series, relays connected with each of the series connected secondary windings of said transformer sets, the coils of the said relays associated with the same piece of apparatus being connected to form a common point, relays having current coils connected with the star points of said transformer sets and having a voltage coil, and relays connected with the common point connection of the coils of the first said relays and between the current coils of the second said relays, all of said relays being arranged for selectively connecting said electromagnetic devices and the said source of current associated therewith in response to the occurrence of fault conditions of any piece of the apparatus.

5. In a system for selectively protecting a plurality of pieces of electrical apparatus each having a grounded neutral point and being arranged for connection in parallel with an electric line, a circuit breaker for connecting and disconnecting each piece of apparatus and the line, an electromagnetically operated device for releasing each of said circuit breakers to permit disconnecting movement thereof, a source of electric current for energizing each of said electro-magnetic devices, a plurality of relays arranged to connect each of said electromagnetic devices with one of said sources of current, one of said relays associated with each piece of apparatus having a current coil and a voltage coil, a voltage transformer connected in star with the line and in parallel with the apparatus, the secondary winding of said transformer supplying voltage in parallel to the voltage coils of said relays, the star point of said transformer being connected with the neutral points of the apparatus, and current transformers associated with the apparatus and connected with the current coils of said relays for cooperation with said voltage transformer to cause selective releasing of said circuit breakers in response to the occurrence of the fault conditions in any piece of the apparatus.

6. In a system for selectively protecting a plurality of pieces of electrical apparatus each having a grounded neutral point and each being arranged for connection in parallel with an electric line, a circuit breaker for connecting and disconnecting each piece of apparatus and the line, an electromagnetically operated device for releasing each of said circuit breakers to permit disconnecting movement thereof, a source of electric current for energizing each of said electromagnetic devices, current transformer sets each comprising a transformer associated with each phase of the apparatus, said transformer sets being arranged between the windings of the apparatus and said circuit breakers, between the windings of the apparatus and the neutral points thereof, each of said sets having a neutral point, the transformers of said sets associated with the same phases of each piece of apparatus being connected in series, a plurality of relays associated with each piece of apparatus and arranged to connect each of said electromagnetic devices with one of said sources of current, one of said relays associated with each piece of apparatus having current coils connected between the neutral points of said transformer sets and having a voltage coil, one of said relays associated with each piece of apparatus being connected with a common point in the series connections of said transformer sets and with a current coil of said relays, and a voltage transformer connected with the line in parallel with the apparatus to supply voltage to the voltage coil of said relays, the primary winding of said voltage transformer having a neutral point connected with the neutral points of the apparatus.

7. In a system for selectively protecting a plurality of pieces of electrical apparatus each having a grounded neutral point and being arranged for connection in parallel with an electric line, a circuit breaker for connecting and disconnecting each piece of apparatus and the line, electromagnetically operated devices for releasing said circuit breakers to permit disconnecting movement thereof, a source of electric current for energizing each of said electromagnetic devices, current transformer sets each comprising a transformer associated with each phase of the apparatus, one of said sets being arranged between the windings of each piece of apparatus and said circuit breakers, another of said sets being arranged between the windings of each piece of apparatus and the neutral points thereof, each of said sets having a neutral point, the transformers of said sets associated with the same phases of each piece of apparatus being connected in series, a plurality of relays associated with each piece of apparatus and arranged to connect each of said electromagnetic devices with one of said sources of current, one of said relays associated with each piece of apparatus having a current coil connected between the neutral points of said transformer sets and having a voltage coil, one of said relays associated with each piece of apparatus being connected with a common point in the series connections of said transformer sets and with a current coil of said relays, and a voltage transformer connected with the line in parallel with the apparatus to supply voltage to the voltage coil of said relays, the primary winding of said voltage transformer having a neutral point connected with the neutral points of the apparatus, and a reactance coil having a core excited by direct current, said coil connecting the neutral points of the apparatus and of said voltage transformer to ground.

8. In a system for selectively protecting a plurality of pieces of electrical apparatus each having a grounded neutral point and being connected in parallel with each other with an electric line, a circuit breaker for connecting and disconnecting each piece of apparatus and the line, an electromagnetically operated device for releasing each of said circuit breakers to permit disconnecting movement thereof, a source of electric current for energizing each of said electromagnetic devices, current transformer sets each comprising a transformer associated with each phase of the apparatus, said sets being arranged between the windings of the apparatus and said circuit breaker, and between the windings of the apparatus and the neutral point thereof, each of said sets having a neutral point, the transformers of said sets associated with the same phases of each piece of apparatus being connected in series, a plurality of relays associated with each piece of apparatus and arranged to connect each of said electromagnetic devices with one of said sources of current, one of said relays associated with each piece of apparatus having a current coil connected between the neutral point of said transformer sets and having a voltage coil, one of said relays associated with each piece of apparatus being connected with a common point in the series connections of said transformer sets and with the current coil of said relays, a voltage transformer connected with the line in parallel with the apparatus to supply voltage to the voltage coil of said relays, the primary winding of said voltage transformer having a neutral point connected with the neutral points of the apparatus, a reactance coil comprising a plurality of coils, a plurality of cores, and means for exciting said cores by direct current, and a source of alternating current, one terminal of said reactance coil being connected with the neutral point connections of the apparatus and said voltage transformer and the other terminal of said coil being connected with said source of alternating current, one terminal of said source of alternating current being connected with ground.

9. In a system for selectively protecting a plurality of pieces of electrical apparatus having a grounded neutral point and arranged to be connected in parallel with an electric line, a circuit breaker for connecting and disconnecting each piece of apparatus and the line, an electromagnetically operated device for releasing each of said circuit breakers to permit disconnecting movement thereof, a source of electric current for energizing each of said electromagnetic devices, current transformer sets each comprising a transformer associated with each phase of the apparatus, said sets being arranged between the windings of the apparatus and said circuit breakers, and between the windings of the apparatus and the neutral point thereof, each of said sets having a neutral point, the transformers of said sets associated with the same phases of each piece of apparatus being connected in series, a plurality of relays associated with each piece of apparatus and arranged to connect each of said electromagnetic devices with one of said sources of current, one of said relays associated with each piece of apparatus having a current coil connected between the neutral point of said transformer sets and having a voltage coil, one of said relays associated with each piece of apparatus being connected with a common point in the series connections of said transformer sets and with the current coil of said relays, a voltage transformer connected with the line in parallel with the apparatus to supply voltage to the voltage coil of said relays, the primary winding of said voltage transformer having a neutral point connected with the neutral points of the apparatus, and a circuit tuned to resonance with the third harmonic of the line frequency and connected across the secondary winding of said voltage transformer to prevent the flow of third harmonics in the voltage coils of said relays.

10. A relay comprising an induction disk mounted for rotation, a plurality of electromagnets arranged to act on said disk, said electromagnets each having a voltage winding connected to form a neutral point, and a plurality of electromagnets arranged to act conjointly upon said disk, one of the last said electro-magnets being connected with the neutral point of the windings of the first said electro-magnets.

11. A relay comprising an induction disk mounted for rotation, a plurality of electromagnets arranged to act on said disk, said electro-magnets having only voltage windings connected to form a neutral point, and a plurality of electromagnets arranged to act upon said disk, one of the last said electro-magnets being connected with the neutral point of the windings of the first said electro-magnets, the action of the first said electro-magnets being in opposition to that of the last said electromagnets.

12. A relay comprising an induction disk mounted for rotation, a plurality of electromagnets arranged to act on said disk, said electro-magnets having voltage windings connected to form a neutral point, a plurality of electromagnets arranged to act upon said disk, one of the last said electro-magnets having a voltage winding and being connected with the neutral point of the windings of the first said electro-magnets, the action of the first said electro-magnets being in opposition to that of the last said electro-magnets, and a spring connected with said disk and acting thereon in opposition to the resultant action thereon of said electro-magnets.

In testimony whereof I have hereunto subscribed by name this 27th day of February A. D. 1932.

JULIUS JONAS.